United States Patent [19]

Harako et al.

[11] Patent Number: 5,310,708
[45] Date of Patent: May 10, 1994

[54] METHOD OF PRODUCING SILICA BRICK

[75] Inventors: Hisayuki Harako, Tokyo; Shushi Akahori, Okayama, both of Japan

[73] Assignee: Shinagawa Refractories Co., Ltd., Tokyo, Japan

[21] Appl. No.: 993,666

[22] PCT Filed: May 11, 1992

[86] PCT No.: PCT/JP92/00595

§ 371 Date: Dec. 21, 1992

§ 102(e) Date: Dec. 21, 1992

[87] PCT Pub. No.: WO93/00309

PCT Pub. Date: Jan. 7, 1993

[30] Foreign Application Priority Data

Jun. 26, 1991 [JP] Japan ................................. 3-154411

[51] Int. Cl.$^5$ ............................................. C04B 35/16
[52] U.S. Cl. ...................................... 501/133; 501/154
[58] Field of Search .................................. 501/133, 154

[56] References Cited

U.S. PATENT DOCUMENTS

| | | | |
|---|---|---|---|
| 258,661 | 5/1882 | Martin | 501/133 X |
| 982,252 | 1/1911 | Collins | 501/133 |
| 2,066,366 | 1/1937 | Salmang et al. | 501/133 X |
| 3,144,345 | 8/1964 | McCreight | 501/133 |
| 3,660,123 | 5/1972 | Smith | 501/154 |
| 4,143,104 | 3/1979 | Konijnenburg et al. | 264/30 |
| 4,230,498 | 10/1980 | Rueckl | 501/133 X |

FOREIGN PATENT DOCUMENTS

| | | | |
|---|---|---|---|
| 1062165 | 7/1959 | Fed. Rep. of Germany | 501/133 |
| 55-130861 | 10/1980 | Japan . | |
| 463949 | 5/1937 | United Kingdom . | |

OTHER PUBLICATIONS

PCT International Search Report Sep. 1992.

*Primary Examiner*—Helene Klemanski
*Assistant Examiner*—David R. Sample
*Attorney, Agent, or Firm*—Kanesaka & Takeuchi

[57] ABSTRACT

A method which enables easy and efficient production of silica brick having small content of residual silica by firing from a siliceous stone material containing silica as the main component, even when the siliceous stone material used is of the type in which transformation of silica is not easy to occur. The method is characterized by adding 0.2 to 5 wt % of $Na_2O$—$CaO$—$SiO_2$ fused and solidified material to the siliceous stone material. The $Na_2O$—$CaO$—$SiO_2$ fused and solidified material, together with a binder, is added to pulverized siliceous stone material, and the mixture is then formed followed by a firing at 1350° to 1500° C., so that the $Na_2O$-13 $CaO$—$SiO_2$ fused and solidified material reacts with silica in the siliceous stone material to promote transformation of the silica into cristobalite and tridymite.

11 Claims, No Drawings

METHOD OF PRODUCING SILICA BRICK

DESCRIPTION

1. Technical Field

The present invention relates to a method of producing silica brick and, more particularly, to a method of producing a silica brick which can suitably be used in building up or repairing various industrial furnaces such as a coke oven, hot blast stove and glass kiln.

2. Background Art

Silica brick is a very important material which is used as refractory for building up and repairing industrial furnaces, mainly coke ovens, hot blast stoves and glass kilns. It is well known that silica, which is the main component of siliceous stone as the principal material of silica brick, is changed into cristobalite and tridymite due to crystalline transformation in the course of firing for production of the silica brick. Any silica brick having large non-transformed silica content is undesirable because it exhibits extraordinary expansion so as to impair stability of industrial furnace which employs such brick as the refractory. Therefore, the extent of transformation of silica is one of very important factors which have to be considered in designing an industrial furnace in regard to selection of material and evaluation of adequateness of the use of the selected material.

As is well known, an ordinary process for producing a silica brick employs the steps of pulverizing a silica material such as red-white silica or blue-white silica into particles of a suitable level of particle size and mixing such particles with lime (CaO) which is an additive effective also as a binder.

A silica brick for use as a material of glass kiln is also known which contains for the purpose of preventing generation of frost-like matter on the brick surface of upper structure of glass melting cell, 0 to 1.5% of CaO, 0.3 to 1.5% of $K_2O$, the sum of the CaO and $K_2O$ contents being not more than 1.5%. (Japanese Patent Publication NO. 49-16087). It has been attempted also to further add elements such as Fe, $Fe_2O_3$, $Cu_2O$, $TiO_2$, Si and so forth.

The degree of ease of transformation of silica in silica material into cristobalite and tridymite caused by heating tends to be affected by factors such as the crystal grain size of silica and impurities in the siliceous stone material, and varies also according to the place where the siliceous stone material is yielded.

In general, greater crystal grain size of silica, as well as smaller impurity content, tends to hamper the transformation of silica.

Hitherto, there has been no proposal in regard to any additive which promotes transformation of silica in silica material with which transformation of silica is not easy, and any method of producing silica brick by using such additive.

DISCLOSURE OF THE INVENTION

The present invention has been accomplished in view of the above-described problems of the prior art, and is aimed at providing a method which can make silica brick with small residual silica content by a process similar to a conventional method with same degrees of ease and efficiency as those in the conventional process, even from a siliceous stone material with which transformation of silica is not easy.

The invention provides a method of producing a silica brick by firing siliceous stone containing silica as the main component, characterized by adding 0.2 to 5 wt % of $Na_2O$—CaO—$SiO_2$ fused and solidified material to the siliceous stone.

Preferably, the siliceous stone material contains 97.5 wt % of $SiO_2$. Substances which may be contained in the siliceous stone, besides $SiO_2$, are $Al_2O_3$, $Fe_2O_3$, CaO, MgO, $Na_2O$ and $K_2O$.

$Na_2O$—CaO—$SiO_2$ fused and solidified material promptly reacts with silica which is the main component of siliceous stone and promotes transformation of silica into cristobalite and tridymite.

According to the method of the present invention, it is possible to reduce the content of residual silica in siliceous stone to 1 wt % or less. The Best Mode for Carrying Out the Invention The $Na_2O$—CaO—$SiO_2$ fused and solidified material used in the present invention is a fused and solidified material which contain $Na_2O$, CaO and $SiO_2$, as well as trace amounts of MgO and $Al_2O_3$, and has the following chemical composition:

$SiO_2$: 70 to 75 wt %
CaO: 5 to 13 wt %
$Na_2O$: 10 to 40 wt %
$Al_2O_3$: 0.5 to 2 wt %
MgO: 0.5 to 4 wt %

The $Na_2O$—CaO—$SiO_2$ fused and solidified material used in the present invention may be obtained by mixing siliceous sand, sodium ash, lime carbonate, magnesium carbonate and sodium feldspar, melting the mixture and then cooling the mixture to solidify it. Preferably, the solidified material exhibits amorphous vitreous state, but may contains crystals derived from the original material.

Preferably, $Na_2O$—CaO—$SiO_2$ fused and solidified material used in the present invention has the form of beads or powder and the grain size is preferably 0.3 mm or less. Small grain size increases the specific surface area, which contributes to prevention of generation of pin-holes in the silica brick as the fired product and also to promotion of reaction with silica as the main component of the siliceous stone material, thus accelerating transformation. Examples of chemical compositions of $Na_2O$—CaO—$SiO_2$ fused and solidified material are shown in the following Table 1.

TABLE 1

| | (wt %) | |
| --- | --- | --- |
| Type | Glass beads | Sheet glass powder |
| Heating weight loss | 0.01 | 0.15 |
| $SiO_2$ | 71.47 | 71.40 |
| $Al_2O_3$ | 1.76 | 1.71 |
| $Fe_2O_3$ | 0.35 | 0.12 |
| $TiO_2$ | 0.04 | 0.27 |
| CaO | 9.36 | 8.10 |
| MgO | 3.25 | 3.88 |
| $Na_2O$ | 13.06 | 13.52 |
| $K_2O$ | 0.76 | 0.65 |

A too large content of the $Na_2O$—CaO—$SiO_2$ fused and solidified material impairs hot characteristics of the silica brick as the product, particularly load softening temperature and anti-creep characteristic, and increases apparent porosity to make the brick unsuitable for use as the material of industrial furnaces. Furthermore, addition of excessive amount of the $Na_2O$—CaO—$SiO_2$ fused and solidified material does not make any appreciable contribution to the reduction of the residual quartz. Conversely, a too small content of the $Na_2O$—CaO—$SiO_2$ fused and solidified material cannot reduce the amount of residual silica to the level of 3 wt % or less. Silica brick containing residual silica in excess of 3 wt % cannot be used suitably as a structural material because such brick exhibits extraordinary expansion during use at high temperatures above 1450° C.

For these reasons, the content of the $Na_2O$—$CaO$—$SiO_2$ fused and solidified material is determined to be 0.2 to 5 wt %. preferably 1.0 to 2.0 wt %, with respect to the siliceous stone material.

The production of siliceous brick in accordance with the method of the present invention may be conducted by, for example, adding the $Na_2O$—$CaO$—$SiO_2$ fused and solidified material to siliceous stone and crushing the mixture or by adding a predetermined amount of $Na_2O$—$CaO$—$SiO_2$ fused and solidified material to crushed siliceous stone and blending the mixture. A plastic binder such as carboxymethyl cellulose, lignosulfonate or molasses is added to the siliceous stone material during crushing or to the crushed siliceous stone material during addition of the fused and solidified material. The mixture is then formed, dried and then fired.

The firing may be conducted in a single kiln or in a tunnel kiln, preferably at a firing temperature ranging between 1350° and 1500° C.

Firing at a temperature below 1350° C. undesirably allows a large amount (more than 3 wt %) of residual silica to remain without being transformed, whereas, firing at a temperature exceeding 1500° C. also is not preferred because in such a case the tridymite generated by transformation is unstable and is liable to be changed into cristobalite.

The present invention is particularly useful when the siliceous stone material used is of such a type that the transformation of silica does not easily occur.

In the method of the present invention, it is possible to add one or both of pre-fired siliceous stone material and brick dust in a total amount which is not more than 40 wt %.

In the method of the present invention, it is also possible to add micro-fine silica powder containing infinite-form silica containing not less than 90 wt % of $SiO_2$. In such a case, the content of the micro-fine silica powder is less than 5 wt % with respect to the siliceous stone material. Addition of such micro-fine silica powder provides increased density of structure of the siliceous brick.

It is also possible to add a CaO-containing material such as lime stone, slaked lime and burnt lime to the siliceous stone material.

The CaO component effectively promotes transformation of silica into tridymite and enhances bonding strength. Preferably, the CaO content ranges between 1.5 and 3.0 wt % with respect to the siliceous material.

When the amount of addition of CaO is less than 1.5 wt %, the corners of the produced silica brick become crumbly and spots are generated in the brick surface to blacken it, resulting in deteriorated appearance of the produced brick. Conversely, presence of CaO in excess of 3.0 wt % reduces the strength of the produced silica brick at normal temperature to make the brick fragile. Presence of CaO in excess of 3 wt % also causes detrimental effects such as increase in the porosity and degradation of hot-characteristics, particularly load softening point is lowered and anti-creep characteristic is impaired.

The invention will be more fully understood from the following illustration of Examples.

EXAMPLE 1

Siliceous stone materials having compositions and crystal grain sizes as shown in Table 2 were prepared, and sheet glass powder (grain sizes 5 to 300 μm) were mixed with these materials at ratios as shown in Table 3. Silica bricks were then produced by an ordinary process. In each case, lime slurry was used as CaO and was added in an amount of 2 wt % with respect to the siliceous stone material, and firing was conducted by using a single kiln at 1410° C.

The characteristics and compositions of the thus-obtained silica bricks are shown in Table 3. The mineral compositions were determined by X-ray diffraction.

TABLE 2

| Siliceous stone material | | (composition: wt %) | | |
|---|---|---|---|---|
| | | A | B | C* |
| Chemical Composition | $SiO_2$ | 98.9 | 99.7 | 97.2 |
| | $Al_2O_3$ | 0.35 | 0.14 | 0.78 |
| | $Fe_2O_3$ | 0.06 | 0.07 | 0.57 |
| | CaO | 0.02 | 0.04 | 0.04 |
| | MgO | tr. | tr. | 0.07 |
| | $Na_2O$ | tr. | tr. | 0.02 |
| | $K_2O$ | 0.10 | 0.01 | 0.17 |
| Silica crystal size (μm) | | 100 to 1000 | 100 to 200 | 5 to 15 (partly 50 to 100) |

*Material in which transformation of silica is easy.

TABLE 3

| Siliceous stone type | | A | | | | | B | C |
|---|---|---|---|---|---|---|---|---|
| Amount of addition of glass (wt %) | | 0 | 0.5 | 1.0 | 2.0 | 3.0 | 2.0 | 0 |
| Characteristics | Refractory degree (SK) | 33 | 32 | 32 | 32 | 32 | 32 | 32 |
| | Apparent porosity (%) | 22.8 | 20.0 | 20.8 | 21.9 | 23.2 | 21.7 | 20.5 |
| | Bulk specific gravity | 1.81 | 1.84 | 1.82 | 1.81 | 1.78 | 1.81 | 1.83 |
| | Apparent specific gravity | 2.34 | 2.31 | 2.31 | 2.31 | 2.31 | 2.31 | 2.30 |
| | Load softening point (°C.) 2 kfg/cm² $T_1$ | 1665 | 1640 | 1630 | 1625 | 1610 | 1625 | 1620 |
| Mineral Comp. | Quartz (silica) | 9.6 | 2.8 | 0.5 or less | 0.5 or less | 0.5 or less | 0.5 or less | 0.5 or less |
| | Cristobalite | 51.3 | 31.5 | 26.9 | 25.3 | 24.8 | 27.3 | 15.3 |
| | Tridymite | 33.7 | 58.8 | 60.5 | 62.1 | 65.0 | 59.9 | 84.0 |
| | Remarks | Comp. Ex. | Ex. | Ex. | Ex. | Ex. | Ex. | Comp. Ex. |

Mineral composition shown by wt %.

From Table 3, it will be seen that the present invention can remarkably reduce the ratio of silica remaining in the siliceous stone material without being transformed, thus enabling production of silica brick which is superior in hot characteristics. Industrial Applicability As has been fully described, the present invention provides a method of producing a silica brick in which transformation of silica into cristobalite and tridymite is effectively promoted, thus making it possible to produce a silica brick in which the amount of residual silica is remarkably reduced to offer superior hot characteristics, even when the siliceous stone material is of the type in which transformation of silica is not easy to occur. The silica brick of the present invention can very suitably be used as high-temperature structural materials for industrial furnaces or the like.

What is claimed is:

1. A method of producing a silica brick, comprising the steps of: pulverizing a siliceous stone material containing silica as a main component; forming the pulverized material; and firing the formed material; wherein the improvement comprises that 0.2 to 5 wt % of $Na_2O$—$CaO$—$SiO_2$ fused and solidified material is added to said siliceous stone material so as to cause the $Na_2O$—$CaO$—$SiO_2$ fused and solidified material to react with silica as the main component of said siliceous stone material, thereby promoting transformation of silica into cristobalite and tridymite, said $Na_2O$—$CaO$—$SiO_2$ fused and solidified material containing, at least, $SiO_2$, $CaO$, $Na_2O$, $Al_2O_3$ and $MgO$, the contents being:

$SiO_2$: 70 to 75 wt %
$CaO$: 5 to 13 wt %
$Na_2O$: 10 to 40 wt %
$Al_2O_3$: 0.5 to 2 wt %
$MgO$: 0.5 to 4 wt %.

2. A method of producing a silica brick according to claim 1, wherein the content of residual silica in a form of quartz is reduced to 1 wt % or less in the firing step.

3. A method of producing a silica brick according to claim 1, wherein the $Na_2O$—$CaO$—$SiO_2$ fused and solidified material is prepared to be an amorphous material.

4. A method of producing silica brick according to claim 1, wherein the $Na_2O$—$CaO$—$SiO_2$ fused and solidified material is prepared to be partly crystalline.

5. A method of producing a silica brick according to claim 1, wherein the $Na_2O$—$CaO$—$SiO_2$ fused and solidified material is formed to have a grain size not greater than 0.3 mm.

6. A method of producing a silica brick according to claim 1, wherein the $Na_2O$—$CaO$—$SiO_2$ fused and solidified material is formed to include glass beads.

7. A method of producing a silica brick according to claim 1, wherein the $Na_2O$—$CaO$—$SiO_2$ fused and solidified material is formed to include powder of sheet glass.

8. A method of producing a silica brick according to claim 1, wherein the $Na_2O$—$CaO$—$SiO_2$ fused and solidified material is added by an amount which is 1 to 2 wt %.

9. A method of producing a silica brick according to claim 1, wherein lime material is added by an amount which is 1.5 to 3 wt % in terms of CaO content to said siliceous stone material.

10. A method of producing a silica brick according to claim 9, wherein said lime material is selected from the group consisting of calcium carbonate, slaked lime and burnt lime.

11. A method of producing a silica brick according to claim 1, wherein the firing temperature is from 1350° to 1500° C.

* * * * *